United States Patent [19]
Hall et al.

[11] 3,832,564
[45] Aug. 27, 1974

[54] RADIATION ABSORBER AND INTENSITY COLLIMATOR UNIT

[75] Inventors: Leland S. Hall, Twain-Harte; Howard Heffan, Concord, both of Calif.

[73] Assignee: The United States of America as represented by the Secretary of the Navy, Washington, D.C.

[22] Filed: Jan. 31, 1973

[21] Appl. No.: 328,206

[52] U.S. Cl. .............................. 250/510, 250/515
[51] Int. Cl. .......................................... G21f 5/02
[58] Field of Search ........... 250/510, 511, 512, 513, 250/514, 515

[56] References Cited
UNITED STATES PATENTS

| | | | |
|---|---|---|---|
| 3,127,514 | 3/1964 | Sharp et al. | 250/513 |
| 3,151,245 | 9/1964 | Wilson, Jr. | 250/511 |
| 3,558,890 | 1/1971 | Vanagasaki | 250/510 |
| 3,659,106 | 4/1972 | Cason | 250/510 |

Primary Examiner—James W. Lawrence
Assistant Examiner—Davis L. Willis
Attorney, Agent, or Firm—R.S. Sciascia and Charles D. B. Curry

[57] ABSTRACT

A radiation absorber which automatically and/or digitally controls the intensity of a radiation source by providing an absorbent measured fixed path for the radiation beam to travel, by the use of a cylindrical helically shaped step wedge to control the intensity of the radiation emitted from the radiation source. By changing the angle of cylindrical shaped step wedge, the thickness of the material in the path of the beam emitted from the source changes, thereby changing the flux of the beam.

10 Claims, 5 Drawing Figures

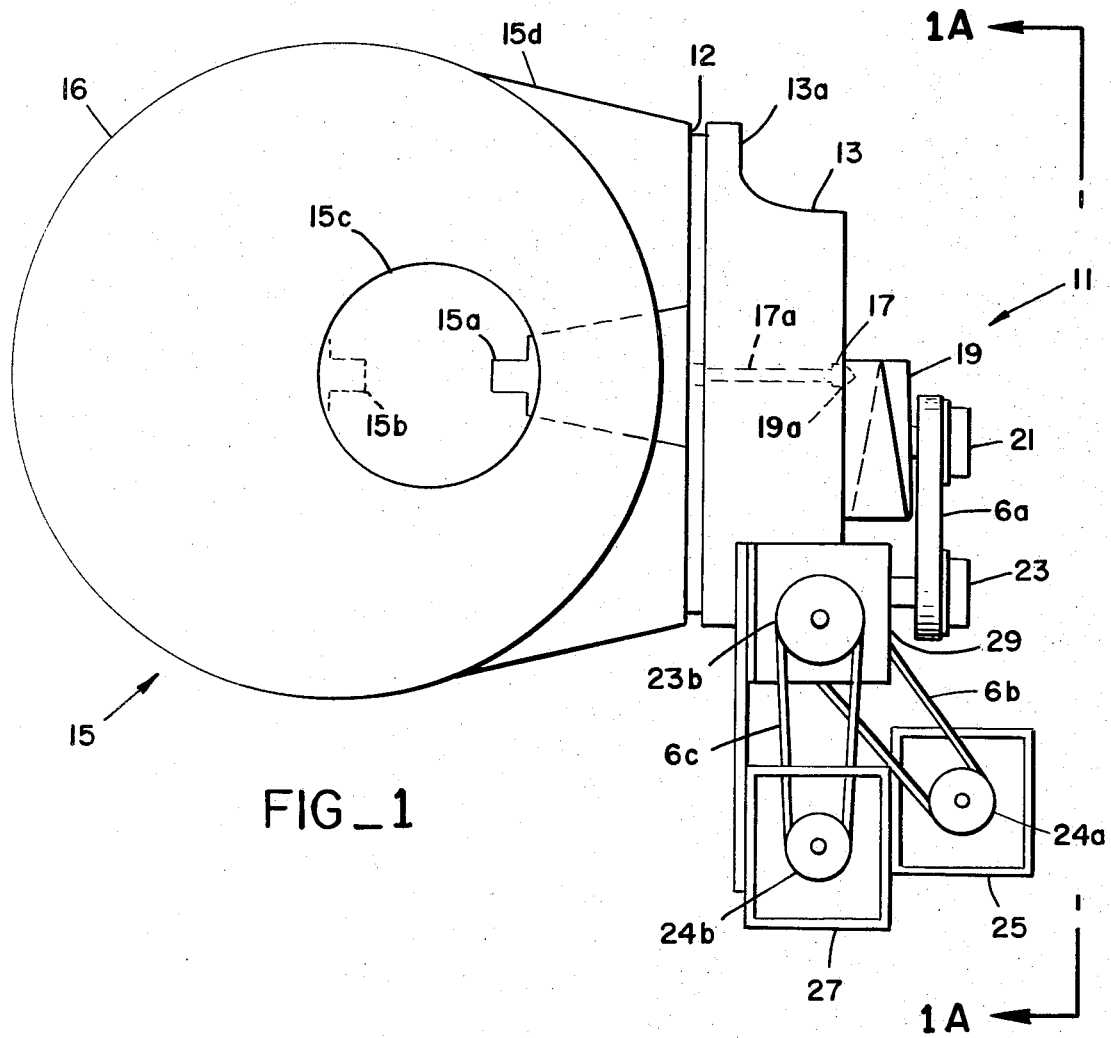
FIG_1
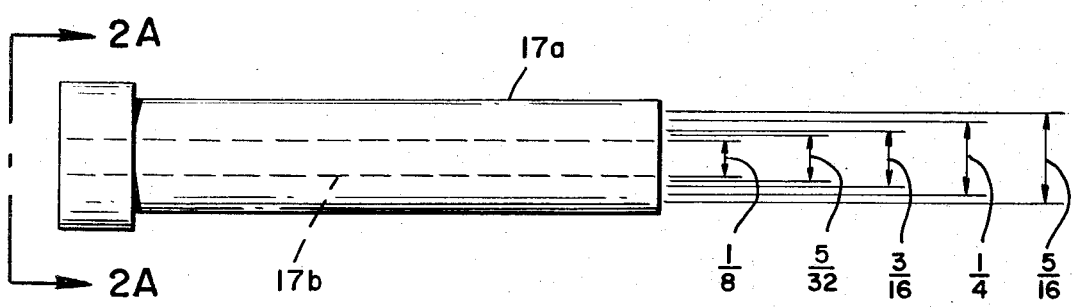
FIG_2
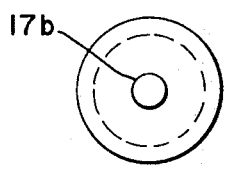
FIG_2A

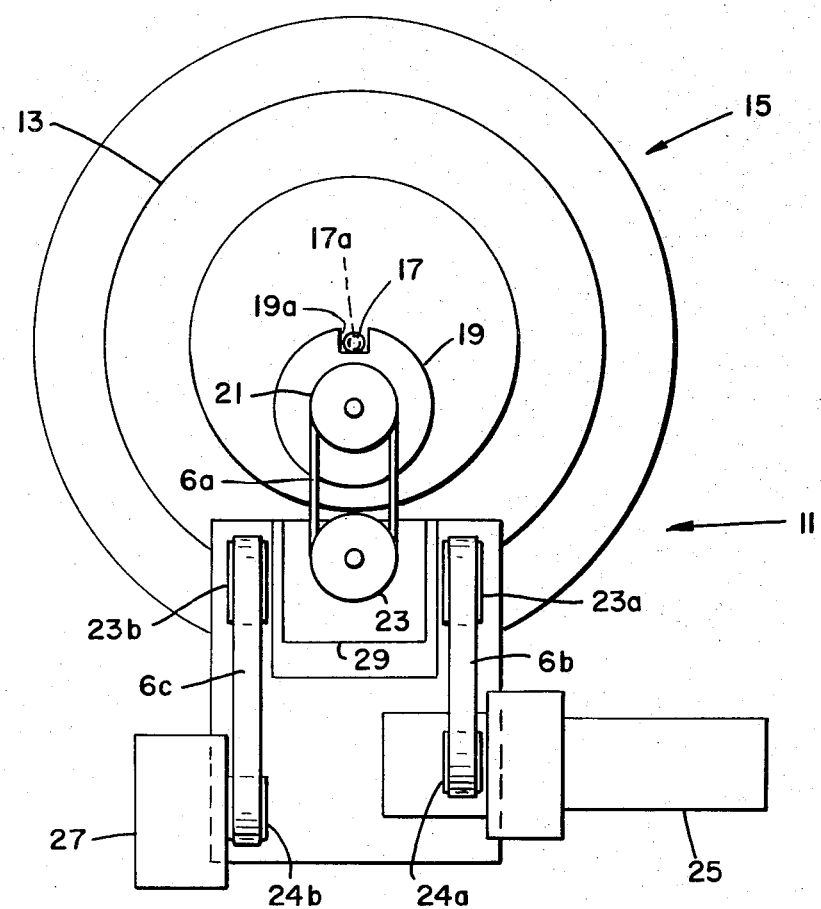
FIG_1A
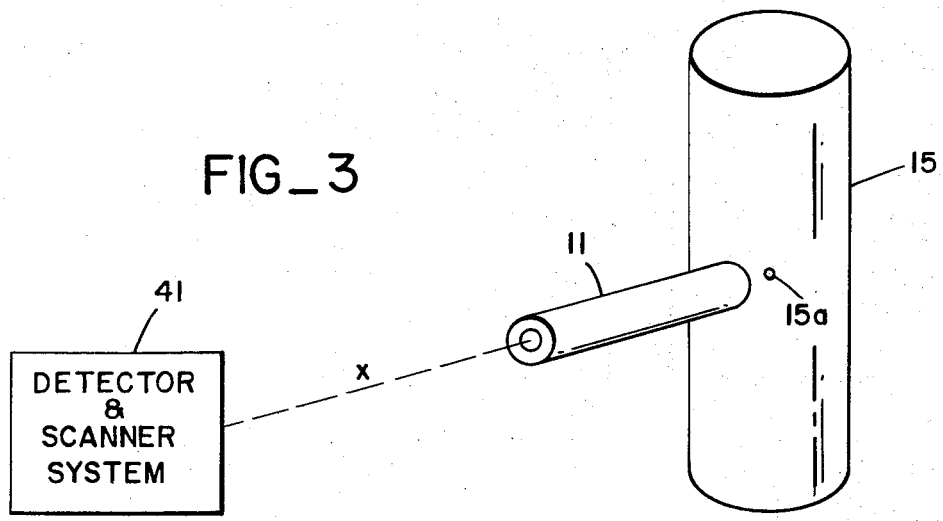
FIG_3

3,832,564

RADIATION ABSORBER AND INTENSITY COLLIMATOR UNIT

This application is copending with applications, Ser. No. 279,780 and Ser. No. 270,781 filed 11 July 1972.

BACKGROUND OF THE INVENTION

1. Field of the Invention

The present invention relates to a device for absorbing radiation from a radiation source, and more particularly, a radiation absorber device which collimates while absorbing radiation by providing an absorbent measured fixed path for the radiation beam to travel in space.

2. Description of the Prior Art

The prior collimating and absorbing systems used variable shutters that were interlaced to provide the desired aperture size. The old systems were unable to effectively control the scattered radiation within very narrow limits; additionally, the shutter systems could not provide the specific reproducable limits as required for normal intensity control.

SUMMARY OF THE INVENTION

The present invention relates to a radiation absorber which automatically and/or digitally controls the intensity of a radiation source by providing an absorbent measured fixed path for the beam to travel, by the use of a cylindrically helically shaped step wedge to control the intensity of the radiation emitted from the radiation source. By changing the angle of the cylinder, the thickness of the material in the path of the beam emitted from the source changes, thus changing the flux of the beam.

STATEMENTS OF THE OBJECTS OF THE INVENTION

An object of the present invention is to provide a means for controlling and absorbing radiation from a radiation device.

Another object of the present invention is to provide a device for collimating and absorbing radiation flux which is directed to a radiation detector.

Other objects, advantages and novel features of the present invention will become apparent from the following detailed description of the invention when considered in conjunction with the accompanying drawings wherein:

BRIEF DESCRIPTION OF THE DRAWINGS

FIG. 1 is a schematic illustration of the side view, parts being broken away, of the radiation absorber and collimator unit attached to the radiation device;

FIG. 1A is a schematic illustration of the top elevation of the radiation absorber and collimator unit attached to the radiation device illustrated in FIG. 1, taken along lines 1A—1A of FIG. 1;

FIG. 2 is an illustration of the variable inserts for the collimator illustrated in FIGS. 1 and 1A;

FIG. 2A is an end view of the inserts of FIG. 2, taken along the line 2A—2A of FIG. 2; and FIG. 3 is a pictorial representation of the absorber, radiation device, detector scanner system and a radiation beam therebetween.

DESCRIPTION OF THE PREFERRED EMBODIMENT

Referring to FIG. 1, the wedge type radiation absorber 11 is generally comprised of the following components: a collimator 13, a radiation device 15, insert aperture 17, cylindrically shaped helical step wedge 19, wedge drive pulley 21, stepping motor 25, and encoder 27. The radiation absorber 11 is mounted on the face of the radiation device 15 and functions to absorb radiation emitted from a radiation source 15a within the radiation device 15, to vary the intensity of a radiation beam. The amount of radiation absorbed by absorber 11 is determined by the degree of rotation of stepping motor 25, which will be described later in the specification. Different types and intensity of radiation sources may be employed; however, it has been found that a 2,000 Curie Cobalt 60 radiation source is satisfactory for most purposes. Therefore, for the purposes of describing the operation of radiation absorber 11, it is assumed that the above described source is employed. See copending patent applications, Ser. No. 270,780 (N.C. 53,326) and Ser. No. 270,781 (N.C. 53,323) describing the function and operation of the absorber with an operational source and radiation detector sensitivity indicator system combination.

Referring briefly to FIG. 3, a stationary detector 41 is mounted in alignment with radiation device 15 and absorber 11 so that the source 15a, beam X, is detected by detector and scanner system 41. A sensitivity indicator may be included for purposes of calibration if desired. A description of a unique helical detector/scanner system is described in the above referenced copending patent applications. The radiation detector 41 is preferably a photomultiplier tube having a sodium iodide crystal optically connected to the photomultiplier tube. The beam passes through radiation absorber 11 and to detector 41.

Referring again to FIG. 1, the radiation device 15 comprises a radiation source 15a, source head 15b, source holder wheel 15c, and enclosure shielding 15d. The source, as indicated above, is a standard unit in the art. The collimator 13 is comprised of an aperture 17 and inserts 17a. Lead, or an equivalent material, may be selected to provide the proper shielding. The aperture 17 is bored on its axis to establish a fixed path for the radiation beam.

Referring to FIGS. 2 and 2A, to provide variable beam intensity an assortment of tungsten inserts 17a are selected to fit into aperture 17. It has been found through experimentation that when the inserts are used they reduce the effective area from about 90 percent to about 37 percent. Intermediate diameter inserts may be used for any specific intensity desired. The selected holes of any size may be chosen; however, it has been found through experimentation that the variable aperture openings 17b of one-eighth inch, five thirty-seconds inch, three-sixteenths inch, one-fourth inch, and five-sixteenths inch diameter should prove adequate. Collimator 13 is attached to head 12 of device 15 in any well known standard manner. The wall 16 provides additional shielding from radiation source 15a. The source 15a, which may be in capsule form, is installed in the source head 15b. When wheel 15c is turned to line up with the aperture 17 in collimator 13, the unit is operational. When wheel 15c is rotated back 180° from its operative or on-position, it is inoperative or off-position. The source 15 a has the additional shielding of the holder wheel 15c superpositioned at the collimator aperture 17 when in the off-position. The operation of source 15a can be controlled by any number of well known control devices which operate or rotate the source wheel 15c. Since the intensity level of the CO-60 gamma rays, or the like, arriving on the detector 41 (see FIG. 3) needs to be held fairly constant during any scanning period while the chords involved with tangential exposures vary considerably due to the need of changing geometry of any item being scanned, a variable type absorber, such as absorber 11, is needed to control the intensity of the beam X at the source 15.

Referring again to FIGS. 1 and 1A, this variable absorption function is provided by lead helix (wedge 19) with stepping motor drive 25 which is installed in the front of collimator 13 to permit programming the allowable percentage of gamma ray beam X for the desired exposure that is needed.

In addition to the wedge absorber 11, varying the beam X, a fixed adjustment is provided by adding or inserting the desired tungsten insert 17a to the collimator 13, as described above. When the strongest beam available is desired, no insert is used. The absorber 11 control, or the step wedge 19, is formed in the shape of a wedge wrapped around a cylinder. By changing the angle of the cylinder, the thickness of lead in the beam changes. This enables precise control of the flux of the beam X emerging from absorber 11.

Referring again to FIG. 1, a description of the absorber and its controls follows: The helically shaped wedge 19 is mounted on a freely turning shaft, offset from and generally flush with collimator 13. The collimator 13 is attached to the radiation device 15 via a welded neck flange 13a in any well known standard manner. Helical wedge 19 is connected to stepping motor 25 and encoder 27 via a belting pulley system described below. Pulley 21 is rigidly attached to step wedge 19 to provide rotational movement for step wedge 19. Pulley 21 is coupled to pulley 23 through cog belt 6a. Pulley 23 is rigidly attached to a conventional 60 to 1 speed reducer 29. Pulley 23 provides the rotational movement for pulleys 23a and 23b, as well as pulley 21, which in turn drives step wedge 19. Pulley 23a is coupled to pulley 24a through cog belt 6b. Pulley 24a drives stepping motor 25. Pulley 23b is coupled to pulley 24b through cog belt 6c. Pulley 24b drives encoder 27. The complete pulley cog belt speed reducer 29 simultaneously drives the stepping motor 25 and encoder 27 while also rotating helical step wedge 19. The pulleys 6b and 6c could be eliminated and encoders 27 and stepping motor 25 could be driven directly off the speed reducer 29 if desired.

Referring particularly to FIGS. 1, 1A and 3 the wedge has a rectangular notch, or slot 19a, at the base of the helix slot. When the slot 19a is interposed over aperture 17 of collimator 13 the maximum beam X flux intensity is provided. This intensity can also be decreased further by use of the inserts 17a, as described above. Further description of varying the radiation beam and its function with respect to a detector is discussed in the copending applications Ser. No. 270,780 (N.C. 53,326) and Ser. No. 270,781 (N.C. 53,323).

A discussion of the operation of the step wedge 19 follows: Using the 60/1 speed reducer 29, when step wedge 19 completes one revolution, the encoder completes 90 revolutions so that when the stepping motor is set, for example at 18,000 steps, this is equal to about 20 counts per revolution, with a resultant encoder revolution of 1,800 counts. When the slot 19a is interposed over aperture 17, maximum beam X intensity is provided. However, as helix 19 is rotated from the minimum wedge thickness to maximum wedge thickness, the beam X intensity is decreased from maximum to minimum. The beam width may be further controlled by the selection of the inserts 17a. Therefore, when the wedge 19 is rotating at speed, the wedge 19 will provide the encoder reading of 1,800 counts while decreasing the beam flux from maximum to minimum. However, if a fixed intensity is desired for some duration of time, the wedge 19 may be stopped at any point along the helix to provide the fixed intensity. There is the additional capability of operating the helix wedge 19 by providing a programmed rotation by increasing and/or decreasing the rotations around a fixed point. All of the above described functions can be performed by the use of any number of well known rotary control devices or systems, as the stepping motor system described above.

The stepping motor 25 can be properly connected to a control system to provide horizontal and vertical scanning, as well as syncronization between the source 15 and the detector 41 if desired. This function or operation is described in copending applications, Ser. No. 270,780 and Ser. No. 270,781. The encoder output can be applied to any number of readout devices well known in the art.

It is further to be understood that the present invention may be used in cooperation with any system to measure any deviation of transmitted radiation, or the like.

What is claimed is:

1. A device for absorbing radiation from a radiation source generating a radiation beam and comprising:
   a. a collimator for collimating said radiation from said source;
   b. a means for continuously uniformly varying the intensity of the collimated radiation emitted from said source and said collimator from maximum intensity to minimum intensity; and a minimum intensity to maximum intensity; and
   c. said flux varying means having a surface area of variable thickness so that when said means is varied the path of the radiation beam emitted from said source is varied in intensity due to the continuously variable thickness of said means.

2. The device recited in claim 1 wherein said means is at least one rotatable cylindrical helically shaped wedge located adjacent said collimator having an aperture.

3. The device recited in claim 2 wherein said collimator aperture is juxtaposed in the path of the radiation source.

4. The device recited in claim 3 wherein said collimator aperture is a variable aperture.

5. The device recited in claim 4 wherein variable aperture is comprised of inserts with varying aperture sizes.

6. The device recited in claim 2 wherein said variable wedge further includes a slot.

7. The device recited in claim 6 wherein variable wedge further includes a means for moving said wedge and said slot.

8. The device recited in claim 7 wherein said slot intermittently increases and decreases the radiation emitted from the radiation source collimator.

9. The device recited in claim 8 wherein said collimator further includes an aperture located within the collimator and located juxtaposed to said source.

10. The device recited in claim 9 wherein said collimator aperture includes a means for varying the aperture.

* * * * *